J. F. SCANLAN.
BUTTER CUTTER.
APPLICATION FILED JUNE 22, 1914.
1,177,900.
Patented Apr. 4, 1916.
3 SHEETS—SHEET 3.
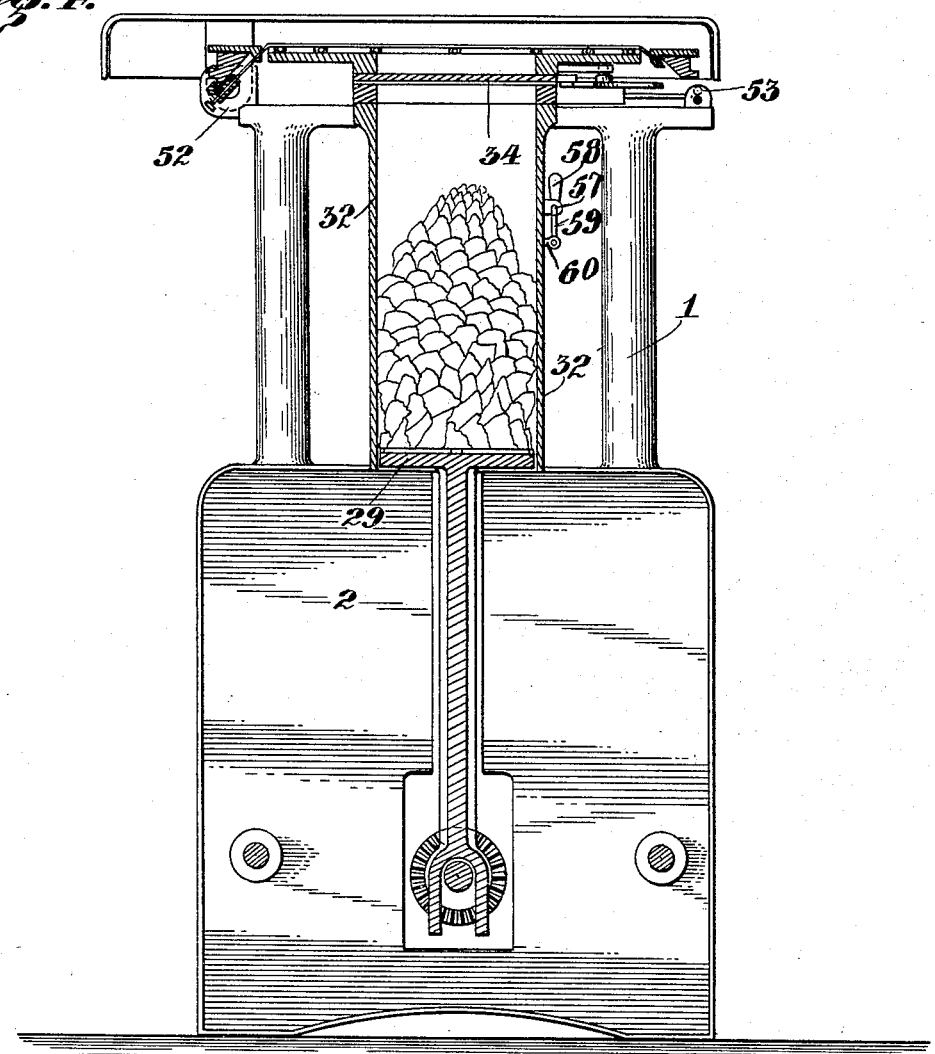
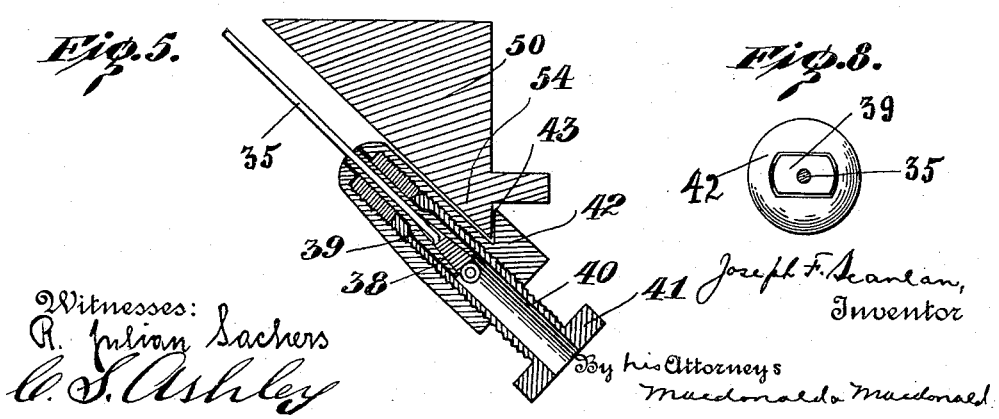
Witnesses:
R. Julian Sachers
C. S. Ashley
Joseph F. Scanlan,
Inventor
By his Attorneys
Macdonald & Macdonald

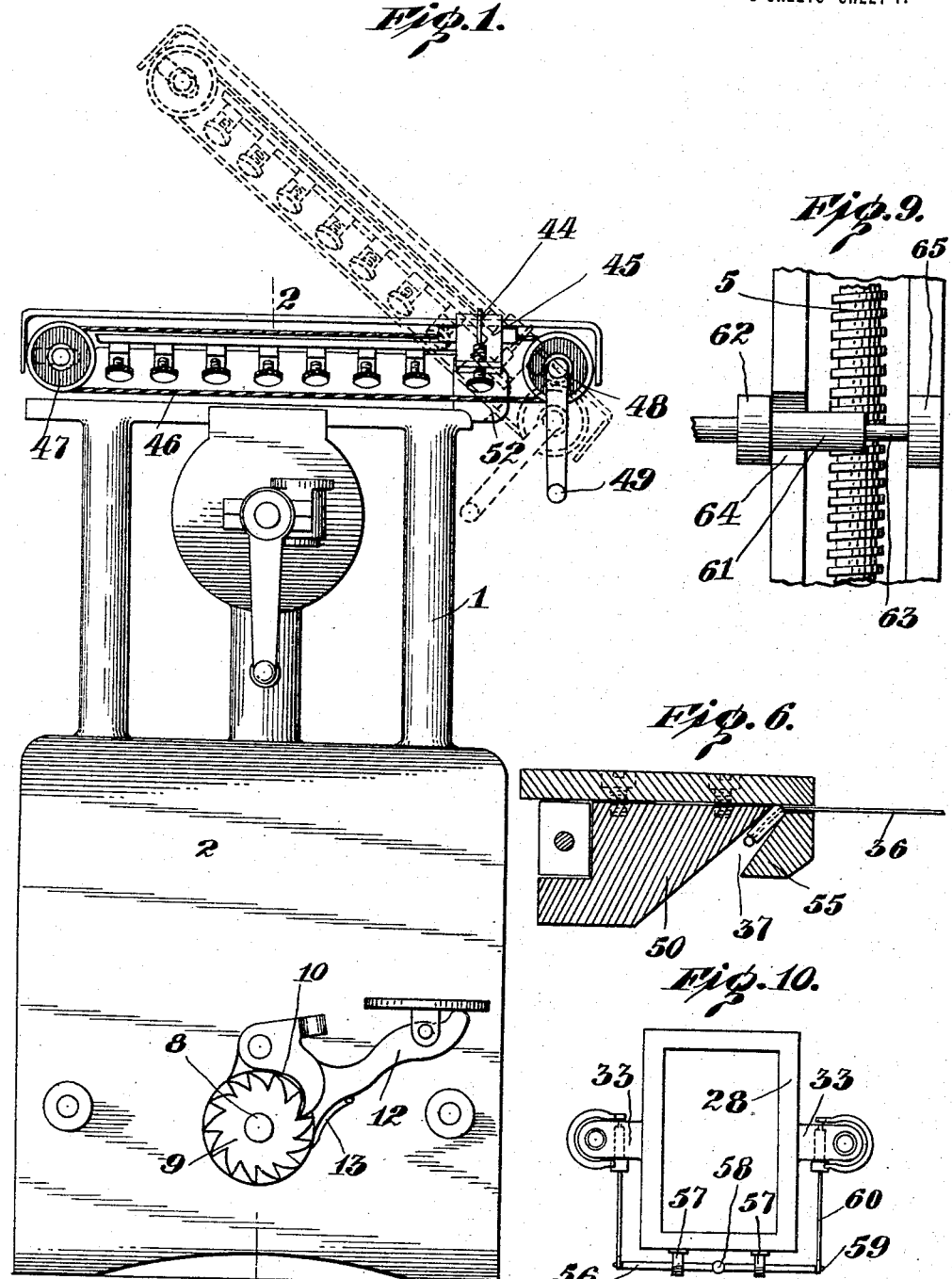

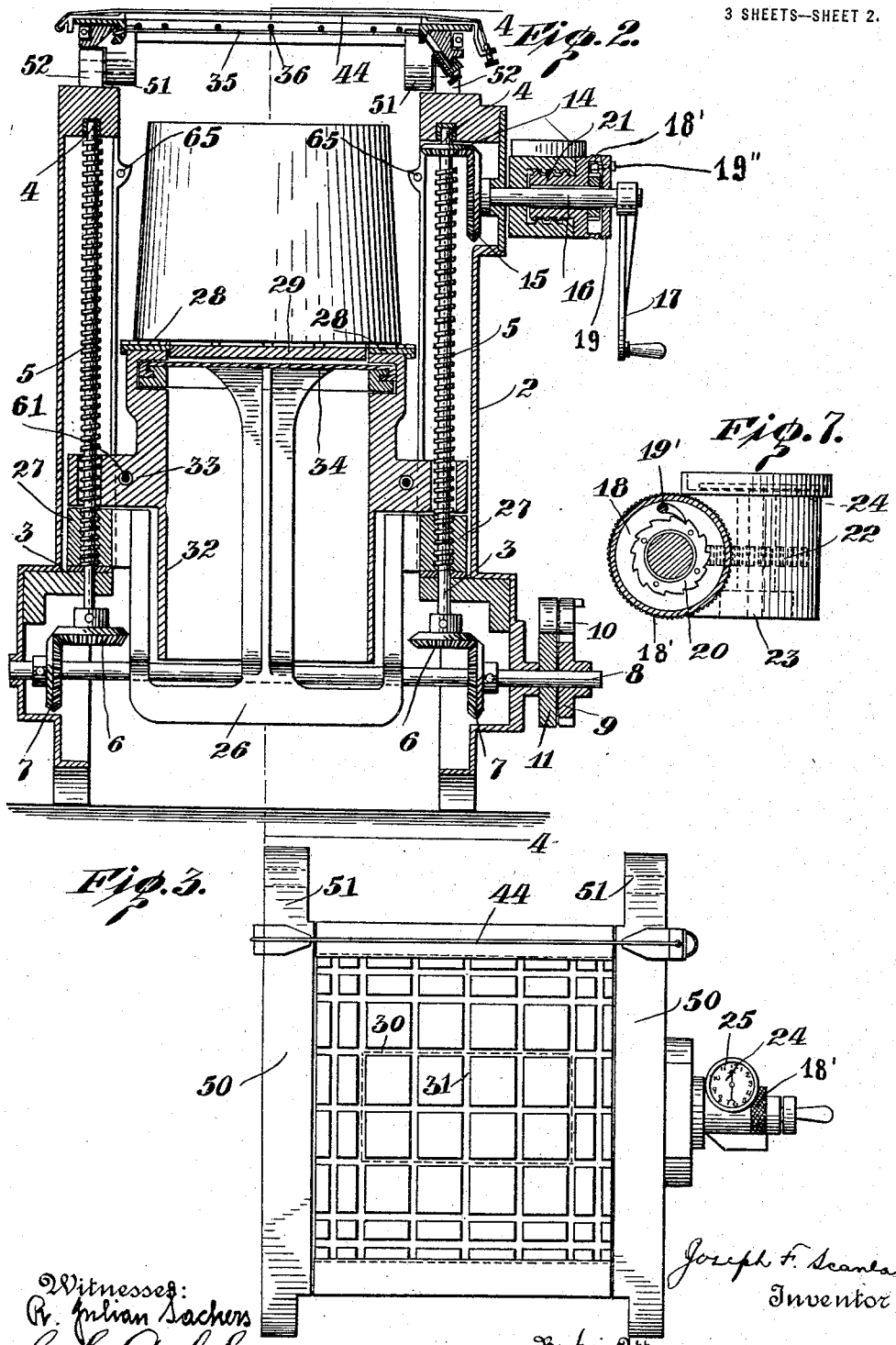

UNITED STATES PATENT OFFICE.

JOSEPH F. SCANLAN, OF NEW YORK, N. Y.

BUTTER-CUTTER.

1,177,900.  Specification of Letters Patent.  Patented Apr. 4, 1916.

Application filed June 22, 1914. Serial No. 846,455.

*To all whom it may concern:*

Be it known that I, JOSEPH F. SCANLAN, a citizen of the United States, and resident of New York, in the county of New York and State of New York, have invented an Improvement in Butter-Cutters, of which the following is a specification.

This invention relates to an apparatus for cutting butter into blocks or cakes of various sizes for distribution in small packages and includes devices to do the work so that the butter is handled as little as possible and its sanitary condition maintained.

It particularly refers to machines in which the cutting means are located above the butter and are easily removed so that the butter may be put on its movable platen directly from the tub without handling the same. For this purpose the entire cutting apparatus is pivoted to the supporting frame to be swung into and out of place as needed.

Another improvement consists in a movable platen upon which the butter rests and which is so arranged that scraps of butter remaining when the entire lump of butter is cut, can easily be collected in a suitable receptacle and compressed for future use.

An additional improvement consists in the provision of a foot power device for assisting in compressing the butter or pressing the same through the cutting device.

A further improvement provides means whereby the cutting wires can be tightened and spaced apart at will in a most efficient way.

Another improvement consists in a device for measuring the extent of movement of the platen upon which the butter rests so that cakes of a given weight can easily be produced, irrespective of the density of the butter.

The accompanying drawings illustrate in Figure 1, a front elevation of the device showing in dotted lines how the cutting devices are pivoted to the frame of the machine. Fig. 2, is a vertical cross section along the line 2—2 of Fig. 1. Fig. 3, is a plan view, with the cutting devices removed. Fig. 4, a vertical cross section along the line 4—4 of Fig. 2, and illustrating the receptacle for receiving scraps. Figs. 5 and 6 are details of construction of the cutting-wire holding device, Fig. 7, is a detail of construction of the measuring device, and Figs. 8, 9, and 10 are other details of construction.

The frame of the machine is indicated at 1, and is partly inclosed in a casing 2. The frame carries suitable bearings 3, and 4, for the screw spindles 5, 5. Each of the spindles is provided at its lower end with a bevel gear 6, meshing with a similar gear 7, on a horizontal shaft 8. A ratchet 9, is keyed to the shaft 8, and is engaged by a pawl 10, secured to a disk 11, loosely held on the shaft 8, and provided with a treadle 12, resiliently held by a spring 13, suitably secured to the casing of the apparatus, or otherwise.

The upper end of one of the screw spindles 5, is provided with a bevel gear 14, in mesh with a second bevel gear 15, on a horizontal shaft 16, having a crank 17. A sleeved cup 18, having a knurled rim 18′, is loose on the shaft 16, and a disk 19, keyed to the shaft 16 carries a pawl 19′, adapted to engage a ratchet 20 formed integral with the cup 18. A knob 19″ serves to turn the pawl and engage or disengage the same from the ratchet. A worm screw 21 on the sleeve of the cup 18, engages a worm gear 22, keyed to a vertical shaft 23, and the upper end of the shaft carries a pointer 24, rotatable over the face of a dial 25, provided with graduations for determining the weight of the cakes of butter.

A movable frame 26, provided with screw-threaded bearings 27, the latter engaging the screw spindles 5, is vertically movable by the operation of either the treadle 12, or the crank 17, or both.

The platen for receiving the tub of butter is divided, and comprises a marginal portion 28, and a center portion 29, both of which provided with intersecting grooves 30 and 31, adapted to receive the stationary cutting wires, should the platen have been moved sufficiently upward to contact with the latter. The center portion 29 of the platen is carried by the frame 26, while the marginal portion 28, is carried on the upper part of a receptacle 32, having bearing sleeves 33, loosely surrounding the screw spindles 5, and resting upon the bearings 27 of the frame 26. In case the frame 26 is moved upward, the receptacle 32 is moved at the same time. It is provided with a slidable cover 34, normally removed, when the two portions of the platen are located in one plane.

The cutting device comprises the intersecting stationary wires 35, 36, one end of each wire secured in the bevel recess 37 of one side of the top frame, while the other end is provided with a cone-shaped plug 38, located in the correspondingly formed sleeve 39, and held in a hollow screw spindle 40, having a milled head 41. This screw spindle operates in a nut 42, held by means of a bevel recess 43, against a correspondingly formed edge of that side of the top frame of the machine, parallel to the first mentioned side. As shown in Figs. 5 and 8, the sleeve 39, holding the wire 35, passes through a suitable opening in the hollow screw bolt 40 and also through an elongated opening of the nut 42, so that the wires 35 are held stationary and cannot be turned or twisted during the tightening of the same by turning the screw bolt 41.

The movable cutting member comprises the wire 44, held on the carriage 45, horizontally movable by means of the endless ropes 46, and the pulleys 47 and 48, to one of which is secured the crank 49. Its tightening means are similar to those employed in connection with the stationary cutting wires.

The frame for the entire cutting mechanism is indicated at 50 and one end thereof is provided with brackets 51 pivotally connected to corresponding brackets 52, of the top of the supporting frame. As clearly shown in the dotted line position of the cutting frame in Fig. 1, the frame can be turned on its pivots so as to entirely clear the top of the apparatus. An entire cutting frame with differently spaced cutting wires may be substituted, if desired. The frame when in operative position is held to the top of the supporting frame by means of a suitable catch 53. It is further provided with prismatic edges 54 and 55, shown in detail in Figs. 5 and 6, of the drawing, for the purpose of engaging the nuts 42 of the wire tightening means and for holding the other end of each wire in the recess 37. The distance between the wires of both sets of parallel wires forming the stationary cutting member, can easily be adjusted by moving the ends of the wires with their attaching parts along the slot 37, formed on the frame 50 and the prismatic edge 55 and the screw nuts 42 of the tightening device, along the prismatic edge 55 and the screw nuts 42 of the tightening device, along the prismatic edge 54 of the opposite parallel side of the frame.

For the purpose of holding the marginal platen section 28 in its elevated position, means are provided comprising a horizontally disposed shaft 56, movable in brackets 57, carried by the receptacle 32. A handle 58 is used to turn the shaft 56. A crank 59 is provided at each end of the shaft, and connected to a rod or link 60, leading to the bolt 61, located at each of the brackets 33. The bolt is extended at one end into an enlarged head 62 and, at the other end into a pin 63. One edge of the casing surrounding the screws 5, is provided with a recess 64 and the other edge with a shoulder 65 having an opening. During the vertical movement of the platen, the head 62 moves along the edge, and when it is desired to hold the platen in the position indicated, the handle 58 is pulled outwardly and the bolt pin 63 enters the opening of the shoulder 65, while the enlarged head 62 rests in the recess 64.

The operation of the device consists, first, in swinging away from operative position the entire frame of the cutting mechanism, then operating the crank 17, or the treadle 12, until the platen 28 and 29 has reached its uppermost position, whereupon the butter is emptied from its tub directly upon the platen and the platen lowered again, until the upper face of the butter is located below the plane of the stationary cutting wires of the cutting mechanism, now lowered in its operative position and held therein by its catch so that the upper face of the butter exactly contracts with the stationary cutting wire. For the purpose of holding the platen in its uppermost position, the supporting frame of the apparatus is provided with shoulders 56, adapted to engage a suitable catch 57 on the upper end of the receptacle 32 supporting the marginal portion 28 of the platen. In the further operation of cutting butter, the platen is raised until the top of the butter is in the plane of the movable cutting wire, then the pointer of the indicating dial is first set to zero and the crank 17 then turned until a sufficient amount of butter is forced through the stationary cutting wires, and above the movable wire corresponding to the desired weight of the cakes of butter to be cut. The crank 49 is then operated, and the movable cutting wire thereby forced through the butter, protruding the stationary cutting wires whereby the butter is cut into individual cakes, and the operation is repeated until the entire tub of butter is used.

One of the essential points of the invention consists in the fact that, for instance, one set of the stationary cutting wires may be arranged to form squares corresponding to one-pound cakes, another set of wires, to form one-half pound cakes, etc., so that with one operation of the movable cutting wire, cakes of different weight may be produced.

As soon as the entire tub of butter is cut into individual cakes which, of course, will take place when the platen has reached its uppermost position and the stationary wires are located in the corresponding grooves 30 and 31 of the platen, the marginal section of the platen is held on the recess 64 and shoulder 65. The crank 17 is then rotated in the direction to lower the frame 26, whereby the center portion of the platen reaches the position indicated in Fig. 4 of the drawing. The cutting frame is then swung out of position and all scraps of butter are collected and dropped through the center opening into the receptacle 32. The slide cover 34 is placed in position and by lifting the bottom 29 again, through the operation of either the crank or the treadle 12, the scraps of butter are compressed to form a solid cake, which, after the removal of the slide 34, is again forced upward through the stationary cutting wires for the purpose of being cut into individual cakes, whereafter the central portion of the platen remains in place to receive another tub of butter. It will be seen that no waste of butter can take place in the use of the apparatus.

Claims:

1. The combination with means for cutting butter into cakes, of a platen for supporting butter and divided into sections, each section movable toward and from said cutting means.

2. The combination with means for cutting butter into cakes, of a platen for supporting butter and divided into sections, and means for supporting each of said sections movably toward and from said cutting means.

3. The combination with a butter cutter, of a platen for supporting butter and divided into sections, means for supporting each of said sections, and means for moving said supporting means toward and from said butter cutter.

4. The combination with a butter cutter, of a platen for supporting butter and divided into sections, means for supporting each of said sections, and means for separately moving said supporting means toward and from said butter cutter.

5. The combination with a platen for supporting butter, of means for cutting butter into cakes, means for moving said platen toward and from said cutting means, a plurality of means for operating said platen moving means, one of said operating means comprising a treadle and pawl-and-ratchet connection for actuating said operating means.

6. The combination with means for cutting butter into cakes, of a platen for supporting butter and divided into sections, a receptacle extending downwardly from one of said sections, means for moving said sections toward and from said cutting means, and means for holding the receptacle carrying section adjacent to said cutting means whereby the second section may be moved in said receptacle toward and from said first section.

7. The combination with a frame, of a plurality of wires supported thereby, devices for holding said wires on said frame, said holding devices being movable toward and from each other, whereby the distance between adjacent wires may be varied at will, and means at one end of each wire and co-acting with said holding devices for stretching said wires.

8. The combination with a supporting frame and a platen adapted to raise or lower a mass of butter thereon, including means for operating said platen, of a cutting device comprising a series of intersecting wires for making vertical cuts in the butter, said wires being stationary with respect to the movement of the platen, means for varying the spaces between said wires, and a horizontally movable wire in substantially the same plane as the wires for making vertical cuts in the butter, said cutting device being pivotally connected to the supporting frame, so that the platen may be easily accessible for receiving butter.

9. The combination with a supporting frame, and a platen adapted for supporting butter, of a cutting device comprising a series of intersecting stationary cutting wires, a cutting wire movable in a plane substantially parallel thereto, and means for operating said cutting wire consisting of a pair of shafts arranged parallel to each other, a carrier on each end of the cutting wire, an endless belt secured to each of said carriers and wound over said pulleys the entire cutting device being pivotally and removably arranged on top of said frame whereby it may be moved into and out of operative position relative to the butter supported on said platen.

10. The combination with a frame having prismatic edges on the sides thereof, of a plurality of wires supported thereby, means for stretching and holding said wires on said frame, said means being movable toward and from each other and comprising a plurality of screw nuts to which said wires are connected, said screw nuts having recesses corresponding to the prismatic edges of the frames for engaging with the latter.

Signed at New York, in the county and State of New York, this 17th day of May, 1914.

JOSEPH F. SCANLAN.

In presence of—
R. Julian Sachers,
Gladys Escher.